United States Patent Office 3,352,655
Patented Nov. 14, 1967

3,352,655
METHOD OF CONTROLLING HEAT APPLICATION TO GLASS TO REPAIR SCORED REGIONS
Herbert W. Barch, Natrona Heights, and Richard V. Posney, Freeport, Pa., assignors to Pittsburgh Plate Glass Company, Pittsburgh, Pa., a corporation of Pennsylvania
No Drawing. Filed Apr. 8, 1964, Ser. No. 358,381
3 Claims. (Cl. 65—28)

ABSTRACT OF THE DISCLOSURE

Apply composition having a higher rate of heat absorption than that of glass in vicinity of a glass sheet region weakened by scoring before the glass sheet is heated above strain point for thermal processing. Composition causes region to heat more rapidly than main body of sheet during general heating. This causes score to begin to heal, thus materially strengthening the scored region during the general heating.

---

The present invention relates to treating glass sheets, and specifically refers to a method of reducing breakage during handling glass plates, particularly those that are weakened locally by localized scoring or drilling. The present invention suggests a relatively inexpensive localized treatment that is easy to introduce into a glass processing operation to strengthen the portion of glass that had been weakened by scoring or drilling.

Many fabricated products of glass require thermal treatment involving heating the sheet to between its strain point and its melting point as a part of their fabrication. Among the many articles of commerce that require such thermal treatment are tempered and partly tempered windows, lenses, cover plates and automotive and other vehicle glazing closures, such as windshields, backlights, vent panes, and sidelights.

Many movable glazing closures for present day vehicles must be drilled to receive actuating rods associated with motors or cranks or other actuating mechanisms for opening and closing the glazing closures. Also, many of the articles of commerce fabricated from sheet glass require precutting to irregular outlines.

Unless considerable care was taken to seam the edges of the precut sheets or to smooth the drilled portion by an expensive seaming operation, vents formed along the edge of the glass periphery or in the drilled portion resulted in breakage during the thermal treatment. This breakage increased in frequency when the demands of the automotive industry caused the glass fabrication industry to produce articles of $3/16$ inch and even $1/8$ inch nominal thickness instead of $1/4$ inch nominal thickness articles sold earlier.

The present invention suggests that the weakened region be heated to a higher temperature than the remainder of the sheet during the overall heating of the sheet to heal vents in the region or regions weakened by cutting and/or drilling. Many obvious local heating methods using heat absorbing materials capable of absorbing heat in a hot atmosphere at a faster rate than glass other than those specified hereinbelow as suitable to heat the glass locally during its overall heating may occur to one skilled in the art as a result of this disclosure.

In a preferred embodiment for producing the desired result, a heat absorbing material having a higher rate of heat absorption than that of glass and adherent to glass is applied to the aperture wall and in the vicinity of the aperture. In cases of extremely thin glass articles, the heat absorbing material is applied along the raw cut margin thereof before starting the thermal treatment. The heat absorbing material should be of the type that remains adhered to the portion of the glass sheet subject to fracture during the heating portion of a tempering cycle and be easily blown off during the chilling portion of the tempering cycle when the glass is quenched by pressurized air blasts.

It is not absolutely certain what transpires, but it is believed that the heat absorbing material applied locally to the vicinity of the areas susceptible to breakage transfers the absorbed heat to the vented edges of the drilled aperture or along the edge and causes the glass to flow locally during the heating phase of the tempering cycle when the glass sheet is generally heated to about 1220 degrees Fahrenheit and localized heat transfer from the heat-absorbing material causes the locally treated portions to become heated to even higher temperatures. The increase in localized glass flow at the locally higher temperatures heals the vents and, thus, many glass sheets previously lost during fabrication are now produced successfully.

Finely divided carbon and/or finely divided copper are ingredients of especially suitable compositions used for the purpose of the present invention. Some of the materials successfully used to treat localized areas subject to breakage have been used in glass molding and glass shaping operations. For example, U.S. Patent No. 2,871,623 to Marini has taught the glass sheet bending art that a dispersion of carbon black in a volatile vehicle helps promote sharp bending if applied locally along the axes of sharp bending. U.S. Patent No. 2,389,360 to Guyer et al. applies an aqueous suspension of colloidal graphite to a marginal portion of a glass sheet and then passes an electric current through the graphite composition to heat the glass locally to an elevated temperature at which glass is electroconductive to deform the edge and fuse the deformed edge onto another glass sheet to form a double glazed unit.

In addition, U.S. Patent No. 417,097 to Scott has suggested that a glass bending mold be provided with a carbon facing and U.S. Patent No. 2,691,854 to Rugg teaches the glass bending art to apply stove polish in the form of carbon black and graphite suspended in a hydrocarbon vehicle and having a small amount of resin added to improve its adherence to a mold surface. Other patents teaching different methods of forming a carbonaceous film on a mold surface include Craig et al., 2,236,119; Skooglund, 2,549,535; and Garratt et al., 2,587,722.

The extensive use of carbon black and graphite in prior art glass operations has been limited to shaping or molding operations. The glass art has appreciated that pulverulent carbon finds extensive use as a lubricant or parting material that prevents hot glass from sticking to a mold. However, to the best of our knowledge, the use of a heat-absorbing material has never been suggested for local application in the vicinity of a weakened region developed on cutting or drilling a glass sheet.

Some of the materials that have been used successfully to reduce breakage in fabricating tempered glass sheets having apertures therethrough to receive actuation rods when installed in a vehicle have included carbonaceous dispersions. Typical examples are suspension 78–24, a stable colloidal dispersion containing 10 percent graphite by weight having an average particle size of less than 1 micron in an organic carrier, sold the under the trade name of Spra-Safe Glass Mold Lubricant by the Joseph Dixon Crucible Company, Jersey City, N.J., and a water dispersion containing 22 percent by weight of colloidal graphite sold under the trade name of Aquadag by the Acheson Colloids Company of Port Huron, Mich.

In addition, a suspension of colloidal copper in linseed oil sold under the trade name of Fel-Pro C5-A high temperature anti-seize threading compound, sold by Felt Products Manufacturing Company of Skokie, Ill. was successfully used.

In applying the various materials enumerated above, a cotton swab attached to the end of a stick was dipped into the colloidal suspension of heat absorbing material and applied locally to the periphery of the aperture before the glass was mounted to a support for movement through a furnace and a tempering station. A single application with the swab was found to be sufficient. A second swab tended to form a coating that flaked off the portion treated according to the present invention.

In a typical operation, a series of apertured glass sheets was treated in succession. Each sheet was treated first by applying a swab dipped in one of the compositions enumerated above to the perimeter of each aperture. The treated sheet was then gripped by tongs suspended from one of a series of carriages and conveyed through a tunnel-like furnace until the glass surface temperature reached about 1220 degrees Fahrenheit. At this time, the leading sheet of the series was removed from the furnace and conveyed between spaced plenum boxes where opposed air blasts were applied against the opposite glass sheet surfaces in a manner familiar to the art while the subsequent glass sheets in the series were being heated toward the 1220 degree Fahrenheit goal.

The heat absorbing material transferred at least some of its selectively absorbed heat into the peripheral wall of the aperture and the area adjacent thereto. This raised the temperature locally to one higher than that of the remainder of the sheet. At this elevated temperature, the glass flowed locally to heal any vents existing in the peripheral wall of the aperture.

The results of the operation described above including the pretreatment at the aperture were compared with results obtained using the same furnace and tempering operations but omitting the pretreatment. Breakage, which was considerable in the operations having no pretreatment, was reduced by the pretreatment to a dramatic degree.

While the present description has described several specific materials suitable for the purposes of the present invention, it is understood that any composition that includes a heat-absorbing material that is adherent to rough glass under the quiescent conditions prevailing within a tunnel-like furnace, but is easily removed from the glass under the turbulent conditions normally encountered in tempering by air blasts, is preferred. Other suitable but less desirable materials are those which absorb heat but require further working to effect their removal from the glass surface after tempering, such as a graphite dispersion or copper flake dispersion in a wax adherent to glass, may be employed.

Furthermore, liquid dispersions of suitable materials may be applied by methods other than a moistened swab. Spraying is an especially suitable method of application.

Several embodiments of suitable materials and a method of application has been described for the purpose of illustration. Various alternatives within the spirit of the present invention will become obvious in the light of the foregoing description and are included in the claimed subject matter which follows.

The term "scored" as used herein refers to scoring incidental to drilling as well as scoring that precedes the opening of a cut incidental to a cutting operation.

While the regions weakened by scoring that are susceptible of strengthening by locally applying a heat absorbing material thereto in the manner described above has been described with reference to treatment of a cut edge or a drilled aperture, it is also within the purview of the present invention to apply such a heat absorbing material to a portion that has been scored accidentally, such as by scratching or abrasion, before its thermal treatment. The localized application of a heat absorbing material in the vicinity of a region subject to fracture improves the strength of the glass sheet treated independently of the manner of its support or of the construction of apparatus used for its support during thermal treatment.

What is claimed:

1. In the art of repairing a glass sheet having a scored region susceptible to breakage during thermal treatment wherein said glass sheet is heated above the strain point and cooled below the strain point for said thermal treatment, the improvement comprising applying to said scored region only a heat absorbing composition having a higher rate of heat absorption than that of glass prior to said thermal treatment, heating said sheet to a temperature between its strain point and its melting point, whereby said heat absorbing composition absorbs heat from the hot atmosphere at a faster rate than the main body of the glass sheet and transfers sufficient of said absorbed heat into said scored region during said heating to cause the area immediately adjacent to the scored region to be of a higher temperature than the main body of the glass sheet and continuing said heating of said main body of the glass sheet at said temperature range until said scored region heals.

2. The improvement according to claim 1, wherein said heat absorbing composition contains finely divided carbon as an essential ingredient.

3. The improvement according to claim 1, wherein said heat absorbing composition contains finely divided copper as an essential ingredient.

References Cited

UNITED STATES PATENTS 2,333,186  11/1943  Landesman et al. _____ 65—28
3,260,584  7/1966   Badger _____ 65—103 X DONALL H. SYLVESTER, *Primary Examiner.*

A. D. KELLOGG, *Assistant Examiner.*